US00RE34932E

United States Patent [19]

Gray

[11] E Patent Number: Re. 34,932

[45] Reissued Date of Patent: May 9, 1995

[54] CONTINUOUS INK JET PRINTING DEVICE

[75] Inventor: Colin Gray, Hemmingford Grey, England

[73] Assignee: Elmjet Limited, United Kingdom

[21] Appl. No.: 41,569

[22] Filed: Apr. 2, 1993

Related U.S. Patent Documents

Reissue of:

[64] Patent No.: 5,115,251
Issued: May 19, 1992
Appl. No.: 568,775
Filed: Aug. 17, 1990

[30] Foreign Application Priority Data

Mar. 16, 1988 [GB] United Kingdom ..... 8806218

[51] Int. Cl.[6] ..... G01D 15/18

[52] U.S. Cl. ..... 347/74

[58] Field of Search ..... 346/45, 75; 347/74

[56] References Cited

U.S. PATENT DOCUMENTS 3,836,913 9/1974 Burnett et al. ..... 346/75
4,338,610 7/1982 Sellen et al. ..... 346/75

*Primary Examiner*—Benjamin R. Fuller
*Assistant Examiner*—Randy W. Gibson
*Attorney, Agent, or Firm*—Kokjer, Kircher, Bowman & Johnson

[57] ABSTRACT

A continuous ink-jet includes a nozzle plate with multiple nozzles for ejecting droplets past a drop-charging electrode assembly located perpendicular to the droplet direction, the assembly and plate disposed with a rigid rail further engaging a groove to align the assembly with the plate.

11 Claims, 4 Drawing Sheets

CONTINUOUS INK JET PRINTING DEVICE

Matter enclosed in heavy brackets [ ] appears in the original patent but forms no part of this reissue specification; matter printed in italics indicates the additions made by reissue.

*Cross-Reference to Related Applications*

*This application is a continuation of PCT/GB89/00274, filed Mar. 15, 1989, now abandoned.*

DESCRIPTION

Downstream of the nozzle(s) of a continuous ink jet printer, are mounted at least one charge electrode, at least one deflection electrode and a gutter: and there may be other items such as a phase detector and/or position detector. These items, particularly the charge electrode(s) must be very accurately located relatively to the ink stream(s) in order to provide consistent and reliable operation. In the past this has been achieved by accurate manufacture and assembly of both the individual components and of the mounting chain between nozzle(s) and electrode(s), often combined with the provision of multiple fine manual adjustments. This has led to high manufacturing costs and to the need for accurate adjustment both on original setting up and during field service.

In accordance with the present invention, a continuous ink jet printing device comprises a nozzle plate with at least one nozzle from which, in use, a jet of ink drops is ejected, and an electrode assembly with at least a drop-charging electrode, the electrode assembly being located relatively to the nozzle plate, at least in directions perpendicular to the direction of the ink jet(s), by virtue of one of the electrode assembly and nozzle plate being rigid with at least one rigid location member, and by virtue of one or more complementary portion(s) rigid with the other of the electrode assembly and nozzle plate engaging directly the location member(s).

This construction facilitates accurate location of the electrode assembly relative to the nozzle(s) with a minimum of precision manufacture, and requiring little or no adjustments. Thus the nozzle opening(s) may be drilled in the nozzle plate in positions accurately related to the location member(s) or to complementary portion(s) which engage(s) the location member(s) by supporting the nozzle plate in a jig which provides a facsimile of the location member(s) or which provides parts to hold the location member(s) if the location member(s) is/are already rigid with the nozzle plate. Similarly, the electrode assembly will be assembled, i.e. the charge electrode(s) and other parts will be mounted on a support body of the electrode assembly, using a jig which provides a facsimile of the location member(s) or which provides pans to hold the location member(s) if the location member(s) is/are already rigid with support body. When the nozzle plate and electrode assembly are then assembled for use, it is only necessary, e.g., to provide or mount the location member(s) on one of the parts and to bring the other part into engagement with the location member(s). The location member(s) is/are conveniently one or more rails extending substantially parallel to the direction of the ink jet(s). Preferably the or each rail is a cylindrical metal dowel. This may be fixed in a hole in the nozzle plate.

The nozzle plate and electrode assembly could both finally be fixed to the location member(s). However, one of the nozzle plate and electrode assembly may have one or more location member-engaging portions in the form of an opening through which the or a respective location member slides, or some means or abutment with the location member(s) which gurantees its position laterally of the ink jet(s), and its attitude, relative to the location member(s) and hence to the other of the nozzle plate and electrode assembly. For example, when the location member(s) include(s) at least one rail, a complementary abutment portion may in the form of a groove of V-shaped cross-section receiving and being urged against a longitudinal edge of the rails. Another abutment portion, which may be a flat surface, may be urged against the other rail. This provides very simply positive location of the part relatively to the rail in all directions transversely to the rail, and against twisting about axes both longitudinally and transversely of the rail, i.e. location in all degrees of freedom except translational movement along the rail parallel to the ink jet(s). In practice this is the least important degree of freedom in which location is to be provided, both because it is less critical in operation, and also because some adjustment of the deflection electrode(s) along the ink jet may in any case be necessary to accommodate different inks which break up into droplets.

However, if relative translational movement between the nozzle plate and electrode assembly in a direction parallel to the ink jet(s) is also to be limited, this can also be provided by abutment of the complementary portions of the nozzle plate or electrode assembly with the location member(s) for example by providing a three point contact, at least two each consisting, for example, of a projection urged into nesting engagement with a recess. Alternatively, it could be achieved by a modification of the V groove solution if an additional engagement is provided to limit movement of the rail along the groove.

The abutment arrangement is useful for the electrode assembly when the electrode assembly is to be retractable laterally away from the ink jet(s), for example to provide access to the nozzle(s), or upon start up or when cleaning is required. This is because the electrode assembly can be loosely mounted on a carrier and arranged automatically to locate itself in its correct position as the complementary portion comes into abutment with the location member, preferably under the action of a spring acting between the carrier and the electrode assembly.

The engagement between the electrode assembly and carrier, although allowing relative movement in the degrees of freedom which are to be limited by the engagement with the rail(s) or other location member(s), may provide another solution for limiting the relative translational movement parallel to the rail(s). For example, the carrier may be provided by pivoted arms, which are arranged-one on each side of the electrode assembly, and provide rotational lost motion couplings, such as pins and slots, or sliding ball joints, with respective ends of a body of the electrode assembly. The carrier may be reciprocatable on a slide, but is preferably pivotally mounted so that it can swing about an axis which may be parallel or perpendicular to the jet direction.

In multijet systems, a deflection electrode is frequently comb-shaped, one jet passing between each adjacent pair of comb teeth. In order to avoid interception of the jets by the comb teeth, owing to lateral offset of the electrode assembly as it is brought into its working position, and before the rail fully engages the V groove, lead-in surfaces may be provided on one of the electrode assembly and nozzle plate to engage the other to centralize the comb relatively to the ink jets as they approach one another.

When the rail and V groove construction is used, there will normally only be one V groove engaging one rail, a flat portion, for example at the bottom of a slot, side surfaces of which provide the lead-in surfaces for lateral centralization with the comb-shaped electrode, engaging another rail.

The electrode assembly may be in the form of two separate sub-assemblies having respective carriers which are retractable on opposite sides of the ink jet(s) and of the location member(s). Each of the sub-assemblies may then be provided with one of the V grooves for engagement with a respective rail, but usually only that carrying the charge electrode, particularly when this is comb-shaped, will need to be provided with the lead-in surfaces for lateral centering as the sub-assemblies are advanced.

Some examples of printing devices constructed in accordance with the invention are illustrated diagrammatically in the accompanying drawing, in which.

For ease of description the device will be described oriented such that the ink jets are directed vertically downwardly, although the device may be used in a different orientation.

Figure 1:
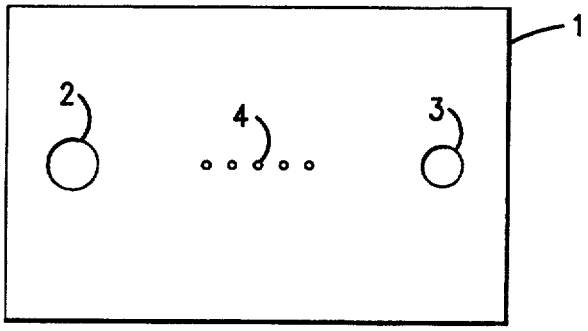
FIG. 1 is an underneath view of a nozzle plate.
Figure 2:
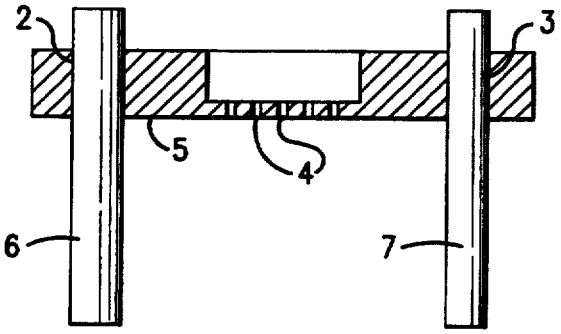
FIG. 2 is a side view of the nozzle plate shown in FIG. 1.

As shown in FIGS. 1 and 2 a nozzle plate 1 is provided with two accurately positioned and aligned dowel holes 2, 3 set one at each end of a line of nozzle orifices 4. These orifices are formed in the plate accurately positioned relatively to the master dowel hole 2 and to the line between the dowel holes and with their axes aligned relatively to the dowel holes or to the face 5 of the nozzle plate. This can readily be achieved with an appropriately designed, jig and forming machine. A multinozzle plate requires accurate pitching and alignment of the orifices in any event. Dowels 6 and 7 may be inserted into the dowel holes 2, 3 prior to forming the orifices 4 and use for location, or may be inserted afterwards in which case the holes will have been used for location.

Figure 3:
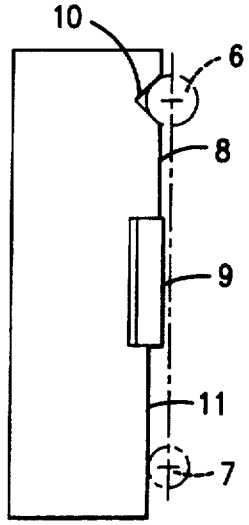
FIG. 3 is a plan of one electrode sub-assembly.
Figure 4:
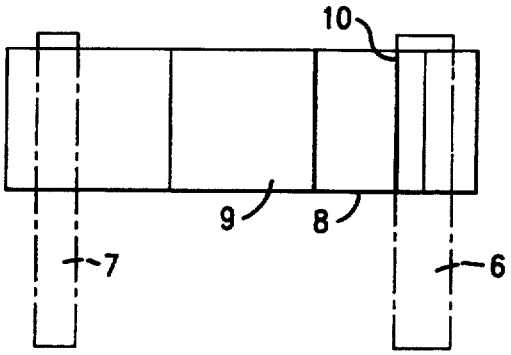
FIG. 4 is a front elevation of the electrode sub-assembly.

FIGS. 3 and 4 illustrate one electrode sub-assembly comprising a "live" block onto which charge and deflector electrodes 9 and possibly other items are mounted. The block is provided with complementary parts engaging the nozzle plate dowels 6, 7 and comprising a straight V groove 10 which receives the master dowel 6 and a flat 11 which engages the other dowel 7. During assembly the block 8 is mounted in a jig on a facsimile of the nozzle plate dowels and electrodes etc. are accurately located in the jig and secured to the body by means, such as potting. Thus when the block is offered to, and urged against, the nozzle plate dowels, the electrodes will be accurately positioned relatively to the orifices 4 except in a direction parallel to the dowels, i.e. to the ink streams. In other words, the sub-assembly will be located against twisting about any of three perpendicular axes parallel or perpendicular to the ink jets, and against translational movement in any direction perpendicular to the ink jets.

Figure 5:
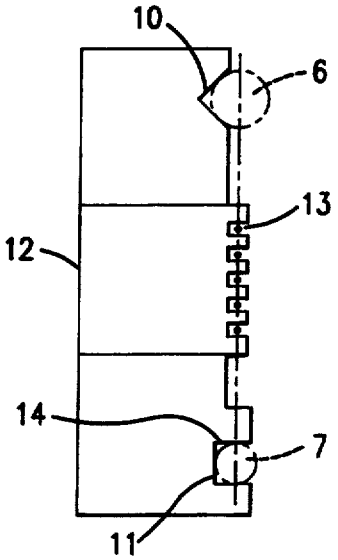
FIG. 5 is a plan of another electrode sub-assembly.
Figure 10:
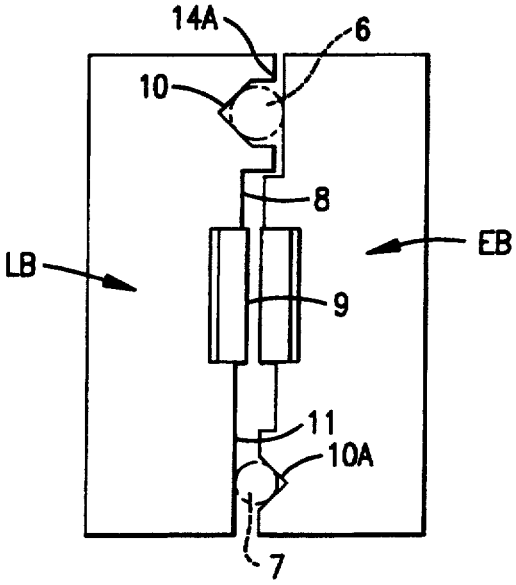
FIG. 10 is a plan showing the juxtaposition of two electrode sub-assemblies of a print head.

As shown in FIG. 10, there will normally be two of the sub-assemblies similar to that shown in FIGS. 3 and 4, and these may be termed a "live" block LB fitted with the charge electrode and live deflection electrode and an "earth" block EB fitted with the earthed deflection electrode. The block LB is shown having a V groove 10 providing the essential location with the master dowel 6 and the block EB having a V groove 10A engaging the dowel 7. This is the preferred arrangement as it is the live block carrying the charge electrode which requires the more precise location. This is particularly so when, as shown in FIG. 5, a charge electrode 12 has a comb-like shape such that each ink jet 13 passes through a respective slot between adjacent teeth of the comb with a very small lateral clearance. When such an electrode is being moved towards running jets it must be reasonably accurately located laterally even before the V groove 10 engages the master dowel 6. This location may be provided by providing lead-in surfaces at the entrance to a groove 14, the depth of which is such that the lead-in surfaces engage the secondary dowel 7 before the comb engages the jets, and the separation of which limits lateral movement to prevent the jets touching the comb whilst allowing the V groove 10 to take over the lateral location once it engages the master dowels. Alternatively, and preferably, as shown at the top of the sub-assembly LB in FIG. 10 a groove 14A providing the lead-in surfaces may alternatively be provided at the entrance to the V groove 10. It is acceptable to allow slight lateral movement of the block EB and the groove 10A could be omitted so that both sides of the block EB engage the dowels 6 and 7 in similar fashion..

Figure 6:
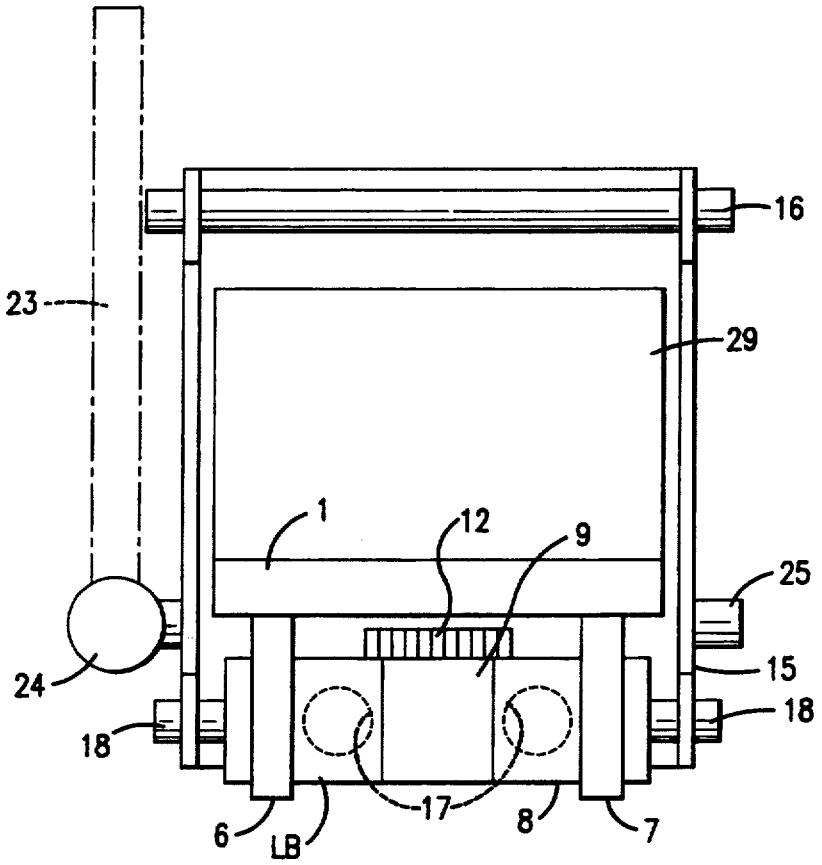
FIG. 6 is a front elevation of part of a print head.
Figure 7:
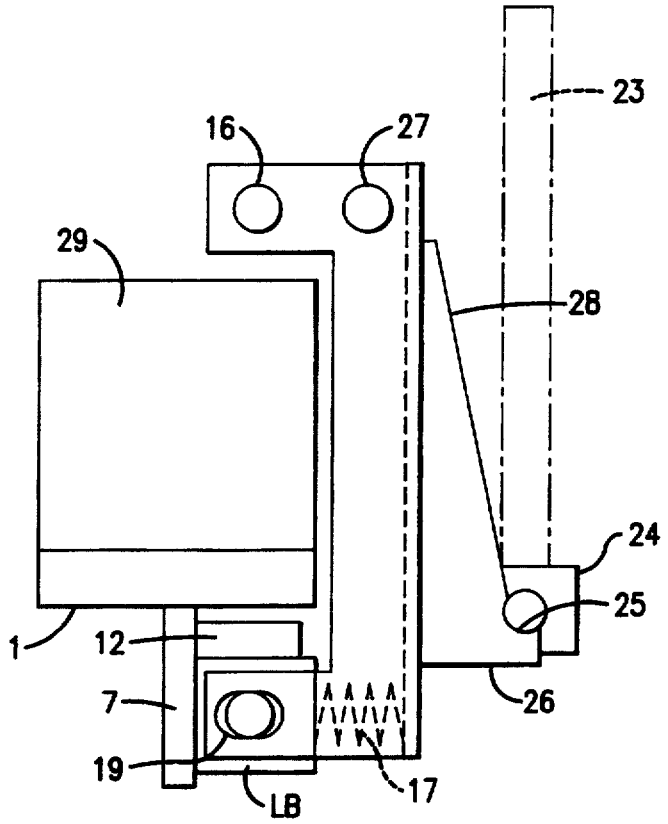
FIG. 7 is a side elevation of the part of the print head.

Although the electrode sub-assemblies LB and EB may be advanced and retracted relatively to one another and to the dowels 6 and 7 by a linear slide mechanism, a pivotal arrangement is preferred. Thus as shown in FIGS. 6 and 7, the "live" block LB is mounted on a swinging carrier 15 formed of bent sheet metal and pivotally, mounted at its upper end about a horizontal pin 16. The block LB has, at each end, projecting pins 18, which are rotatable in, and slidable horizontally along, respective elongate slots 19 adjacent to the bottom of the carrier. The diameter of each pin 18 is insignificantly smaller than the width of each slot 19, whereby the block LB is free to rotate and twist relatively to the carrier 15, but the carder provides location against translational movement of the block in the vertical direction, i.e. parallel to the dowels 6 and 7 and to the ink jets. The carrier 15 may be latched in its illustrated operative position by rotating a rod 23 about an axis 24 so that it rides down a cam surface 28 of a cam 26 fixed to the carrier 15, and into a notch 25. Springs 17 acting between the back of the carder and the block LB then urge the block to abut the dowels 6, 7 by means of the V groove 10 and flat 11, the sub-assembly LB automatically accommodating itself into the predetermined position relatively to the jets irrespective of looseness between the block and carrier and of any looseness or tolerances in the mounting or construction of the carder. The sub-assembly engages the dowels before the rod 23 is fully home in the notch 25, so that the final movement of the rod 23 progressively compresses the spring 17 to provide both the engagement and latching forces.

Figure 11:
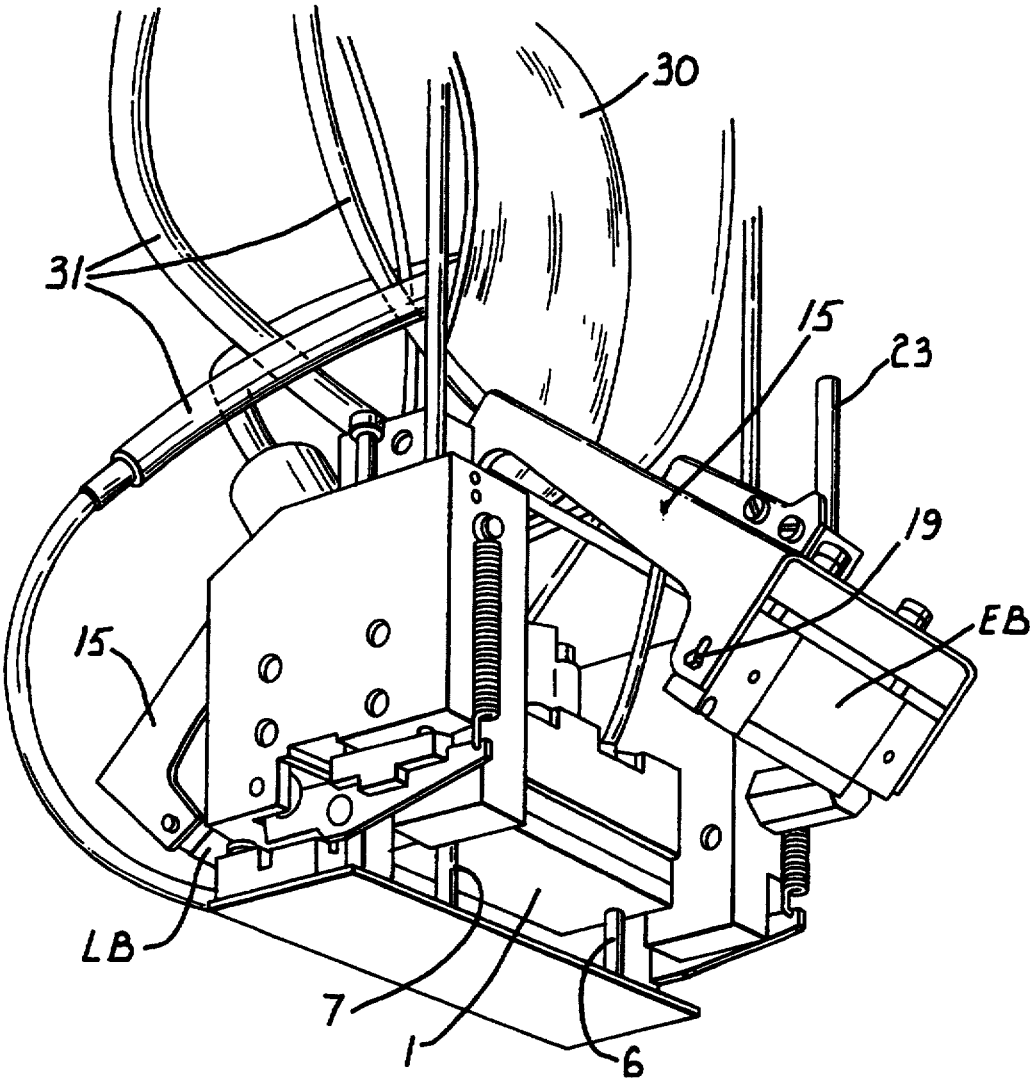
FIG. 11 is a perspective view of a print head.

As described with reference to FIG. 10, there will normally be two sub-assemblies LB and EB, although only one is shown in FIG. 7. This will be clear from FIG. 11 which shows a print head in accordance with the invention, although the individual parts, such as the electrode assemblies and their carriers are shown to have shapes different from the diagrammatic representations in the other views. FIG. 11 shows wiring 30 for conducting electrical control signals to a vibrator for forming the ink jets and to the electrodes, and ducting 31 for the supply and recirculation of ink.

As previously mentioned, the location provided by the carrier 15, i.e. in the vertical direction, is in the least critical direction. It may in any case be necessary to provide adjustment in this direction relatively to the nozzle plate 1 and such an adjustment is conveniently provided by moving the pivot pin 16 relatively to the drop generator body 29, which carries the nozzle plate 1.

Figure 8:
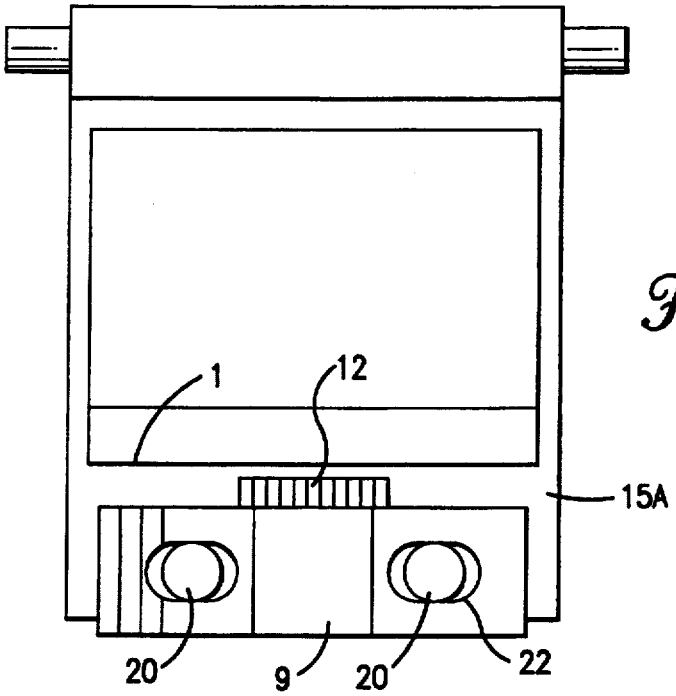
FIG. 8 is a front elevation of part of another print head.
Figure 9:
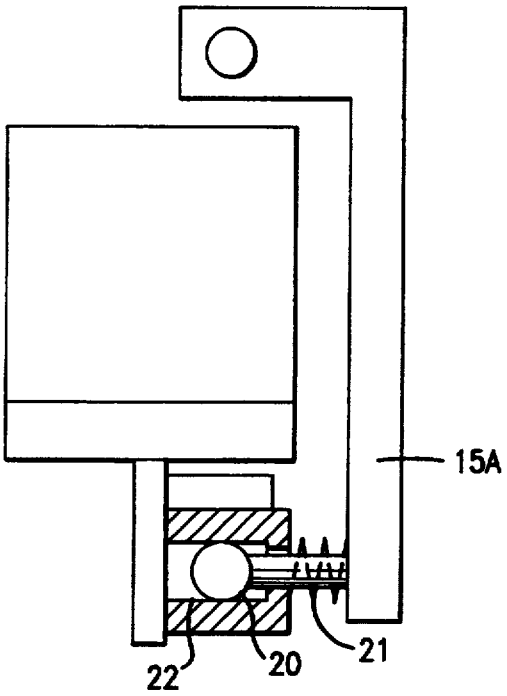
FIG. 9 is a side elevation of the part shown in FIG. 8.

FIGS. 8 and 9 show an alternative method of supporting a sub-assembly LB or EB on a carrier 15. In this case, instead of the pins 18 and slots 19, slots 22 in the sub-assembly receive respective part-spherical ends 20 on pins 21 fixed to the carrier 15a. The slots 22 have dimensions greater than the diameter of the sphere in both transverse directions, however, vertical location is again provided.

With the carrier providing the full location in the vertical direction, there is a degree of overlocation in that both the carrier and the V groove are setting the parallelism of the electrode sub-assembly to the nozzle plate. Any problem here can be minimized by keeping the length of the V groove short, and this will also help with the theorectical overlocation between the length of the V and the length of the flat. An alternative is to use the carrier to locate one end only of the sub-assembly block in the vertical direction, and where the V groove can be sufficiently long, this would be practicable. In the FIGS. 8 and 9 example, it could be implemented by reducing the diameter of one of the part spherical ends 20, so that it supports the disengaged sub-assembly block, but the V groove takes control once it has been engaged.

If, in FIG. 7, the pivot 16 is moved to position 27, then swining of the carrier after the sub-assembly LB has engaged the dowels will produce axial movement of the sub-assembly along the dowels. If the latching position is not accurate then this movement is undesirable, but if the latching position is adjustable, then it could provide the adjustment in the drop break-up length previously mentioned.

I claim:

1. A continuous ink jet printing device comprising a nozzle plate (1) with a plurality of nozzles (4) from which, in use, jets of ink drops are ejected, and an electrode assembly (LB) with a drop-charging electrode (9), the electrode assembly being located relatively to the nozzle plate in directions perpendicular to the direction of the ink jets by virtue of one of the electrode assembly and nozzle plate being rigid with a rigid rail (6, 7), and by virtue of a groove (10) rigid with the other of the electrode assembly and nozzle plate engaging directly the rail, said groove having opposing edge surfaces engaged by the rail.

2. A device according to claim 1, in which a complementary portion (11) rigid with one of the electrode assembly and nozzle plate is urged against another rail (7) rigid with the other of the electrode assembly and nozzle plate.

3. A device according to claim 2, in which the another complementary portion (11) is flat.

4. In a continuous ink jet printing device, the combination comprising a nozzle plate with a plurality of nozzles adapted to produce a plurality of running jets of ink drops; an electrode assembly with a drop-charging electrode; means locating said electrode assembly relatively to said nozzle plate in directions perpendicular to the direction of said ink jets, said locating means including a pair of rigid location members rigid with one of said electrode assembly and nozzle plate and a pair of complementary portions rigid with the other of said electrode assembly and said nozzle plate and adapted to engage directly respective ones of said location members; means loosely mounting said electrode assembly on a carrier; and means for advancing said carrier to bring said electrode towards and into register with said running jets, whereby advance of said carrier with the said location members substantially in alignment with said complementary portions brings said location members and said complementary portions into engagement with one another and said engagement causing automatically any adjustment of said electrode assembly on said carrier necessary for locating said electrode assembly precisely in a preselected position relatively to said nozzle plate.

5. A device according to claim 4, wherein said location members comprise a rail extending substantially parallel to the direction of said ink jets.

6. A device according to claim 5, wherein said rail is a cylindrical metal dowel (6, 7).

7. A device according to claim 6, wherein said dowel is fixed in a hole in said nozzle plate.

8. A device according to claim 4, wherein one of said complementary portions is in the form of a groove which receives said rail whereby edges of said groove abut against said rail.

9. A device according to claim 8, in which another of said complementary portions is urged against another rail.

10. A device according to claim 4, wherein said electrode is comb-shaped, said jets passing between respective adjacent pairs of comb teeth, and there are lead-in surfaces on one of said electrode assembly and said nozzle plate to engage the other of said electrode assembly and said nozzle plate to centralize said electrode relatively to ink jets upon said advance of said carrier.

11. A device according to claim 9, wherein said electrode is comb-shaped, said jets passing between respective adjacent pairs of comb teeth, and there are lead-in surfaces on one of said electrode assembly and said nozzle plate to engage the other of said electrode assembly and said nozzle plate to centralize said electrode relatively to ink jets upon said advance of said carrier; and wherein said another complementary portion is at the bottom of a slot, side surfaces of said slot providing said lead-in surfaces and said another rail being adapted to ride past said lead-in surfaces to provide said electrode centralization.

* * * * *